US011368036B2

(12) United States Patent
Sluijs et al.

(10) Patent No.: US 11,368,036 B2
(45) Date of Patent: Jun. 21, 2022

(54) POWER MANAGEMENT CIRCUIT (71) Applicant: NXP B.V., Eindhoven (NL)

(72) Inventors: Ferdinand Jacob Sluijs, Nijmegen (NL); Jozef Thomas Martinus van Beek, Rosmalen (NL); James Raymond Spehar, Chandler, AZ (US)

(73) Assignee: NXP B.V., Eindhoven (NL)

( * ) Notice: Subject to any disclaimer, the term of this patent is extended or adjusted under 35 U.S.C. 154(b) by 120 days.

(21) Appl. No.: 16/860,944

(22) Filed: Apr. 28, 2020

(65) Prior Publication Data
US 2021/0336470 A1    Oct. 28, 2021

(51) Int. Cl.
*H02J 7/00* (2006.01)
*H02J 7/14* (2006.01)
*B60L 53/62* (2019.01)
*B60L 53/66* (2019.01)

(52) U.S. Cl.
CPC ........ *H02J 7/007188* (2020.01); *B60L 53/62* (2019.02); *B60L 53/665* (2019.02)

(58) Field of Classification Search
USPC ........................................ 320/109, 134, 137
See application file for complete search history.

(56) References Cited

U.S. PATENT DOCUMENTS

| 5,956,626 | A | 9/1999 | Kaschke et al. | |
| 8,169,196 | B2 | 5/2012 | Vantu et al. | |
| 10,122,219 | B1* | 11/2018 | Hosseini | H01M 10/425 |
| 10,447,068 | B2 | 10/2019 | Sluijs et al. | |
| 2013/0271088 | A1* | 10/2013 | Hwang | H02J 7/025 |
| | | | | 320/155 |
| 2015/0333798 | A1* | 11/2015 | Perry | H02J 50/80 |
| | | | | 320/108 |
| 2017/0077995 | A1* | 3/2017 | Leabman | H02J 50/402 |
| 2018/0048178 | A1* | 2/2018 | Leabman | H04B 3/54 |
| 2018/0123400 | A1* | 5/2018 | Leabman | H02M 3/33592 |
| 2018/0201142 | A1* | 7/2018 | Galin | B60L 53/14 |
| 2018/0269570 | A1* | 9/2018 | Hosseini | H02J 50/00 |
| 2018/0287431 | A1* | 10/2018 | Liu | H02J 50/20 |
| 2019/0131827 | A1* | 5/2019 | Johnston | H02J 7/0071 |
| 2020/0006988 | A1* | 1/2020 | Leabman | H02J 50/80 |
| 2020/0292625 | A1* | 9/2020 | Nagano | H01M 10/482 |

FOREIGN PATENT DOCUMENTS

| DE | 102014206164 A1 | 1/2015 |
| DE | 102017203504 A1 | 6/2018 |

OTHER PUBLICATIONS

The Code Artist; "Proximity Sensor on Android Gingerbread"; retrieved from the internet http://thecodeartist.blogspot.nl/2011/01/proximity-sensor-on-android-gingerbread.html Apr. 14, 2020; 12 pages (2011).

* cited by examiner

Primary Examiner — Alexis B Pacheco (57) ABSTRACT

One example discloses a power management circuit, including: an ultrasonic transmitter configured to generate an ultrasonic signal having a set of transmitted ultrasonic signal attributes; an ultrasonic receiver configured to detect the ultrasonic signal having a set of received ultrasonic signal attributes; wherein the power management circuit is configured to cause a device to be operated at a first power level and a second power level; and a proximity detection circuit configured to transition the device from the first power level to the second power level in response to a preselected difference between the transmitted set of ultrasonic signal attributes and the received set of ultrasonic signal attributes.

19 Claims, 5 Drawing Sheets

POWER MANAGEMENT CIRCUIT

The present specification relates to systems, methods, apparatuses, devices, articles of manufacture and instructions for power management.

SUMMARY

According to an example embodiment, a power management circuit, comprising: an ultrasonic transmitter configured to generate an ultrasonic signal having a set of transmitted ultrasonic signal attributes; an ultrasonic receiver configured to detect the ultrasonic signal having a set of received ultrasonic signal attributes; wherein the power management circuit is configured to cause a device to be operated at a first power level and a second power level; and a proximity detection circuit configured to transition the device from the first power level to the second power level in response to a preselected difference between the transmitted set of ultrasonic signal attributes and the received set of ultrasonic signal attributes.

In another example embodiment, the first power level is higher than the second power level.

In another example embodiment, the first and second power levels are non-zero.

In another example embodiment, the first power level includes a first current level for charging the device; and the second power level includes a second current level, less than the first current level, for charging the device.

In another example embodiment, the first power level includes a first voltage level for charging the device; and the second power level includes a second voltage level, less than the first current level, for charging the device.

In another example embodiment, the transmitted and received attributes include at least one of: an amplitude, a phase, an impedance, a delay, and an ultrasonic signal power level.

In another example embodiment, the transmitted and received attributes are configured to vary based on at least one of: a proximity or movement of a user's hand, skin or clothing to the device, a proximity or movement of an object, such as another device, a desk surface, a smartphone, or a battery charger, next to the device, and a proximity or movement of a user's hand to a cable connected to the device.

In another example embodiment, the proximity detection circuit is configured to transition the device from the first power level to the second power level in response to a preselected variation in the difference between the transmitted set of attributes and the received set of attributes over a preselected time period.

In another example embodiment, the proximity detection circuit is configured to not transition the device from the first power level to the second power level if the preselected variation in the difference between the transmitted set of attributes and the received set of attributes does not vary over the preselected time period.

In another example embodiment, further comprising an accelerometer configured to detect movement of the device.

In another example embodiment, the proximity detection circuit is configured to transition the device from the first power level to the second power level in response to either or both the preselected difference between the transmitted set of attributes and the received set of attributes, or movement of the device.

In another example embodiment, the power management circuit is embedded in at least one of: a battery charger, a mobile charger, a battery powered device, an electric car, or an electric car charger.

In another example embodiment, further comprising a power source; wherein the power source is at least one of: a main AC source, or another battery; and wherein the proximity detection circuit is configured to transition the power source from the first power level to the second power level in response to the preselected difference between the transmitted set of attributes and the received set of attributes.

In another example embodiment, the ultrasonic transmitter is configured to pulse the ultrasonic signal; a frequency of the ultrasonic signal is set based on a predefined rate at which the preselected difference between the transmitted set of attributes and the received set of attributes changes; and a frequency of the ultrasonic signal is set based on a predefined rate at which a user can disrupt charging of the device.

In another example embodiment, further comprising a connector coupled to an external surface of the device; wherein the ultrasonic transmitter and ultrasonic receiver are coupled to the connector; and wherein the connector is within a detection range of the ultrasonic signal.

In another example embodiment, the connector is configured to be coupled to a cable from a power source; and the proximity detection circuit is configured to transition the device from the first power level to the second power level in response to an object near the cable.

In another example embodiment, the device is a smartphone; and the object is a user's hand.

In another example embodiment, the device is an electric car charger; and the object is an electric car or a user's hand.

In another example embodiment, the cable has a first end connector configured to withstand a first arcing current; the cable has a second end connector configured to withstand a second arcing current; wherein the proximity detection circuit is configured to transition the device from the first power level to the second power level in response to the object near the first end connector; the proximity detection circuit is configured to transition the device from the first power level to a third power level in response to the object near the second end connector; and the second power is greater than the third power level.

In another example embodiment, the ultrasonic transmitter is a speaker; and the ultrasonic receiver is a microphone.

In another example embodiment, the device is configured to be coupled to a wireless charger; the ultrasonic transmitter and ultrasonic receiver are configured to be coupled to the wireless charger; and the wireless charger is within a detection range of the ultrasonic signal.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Figure 1:
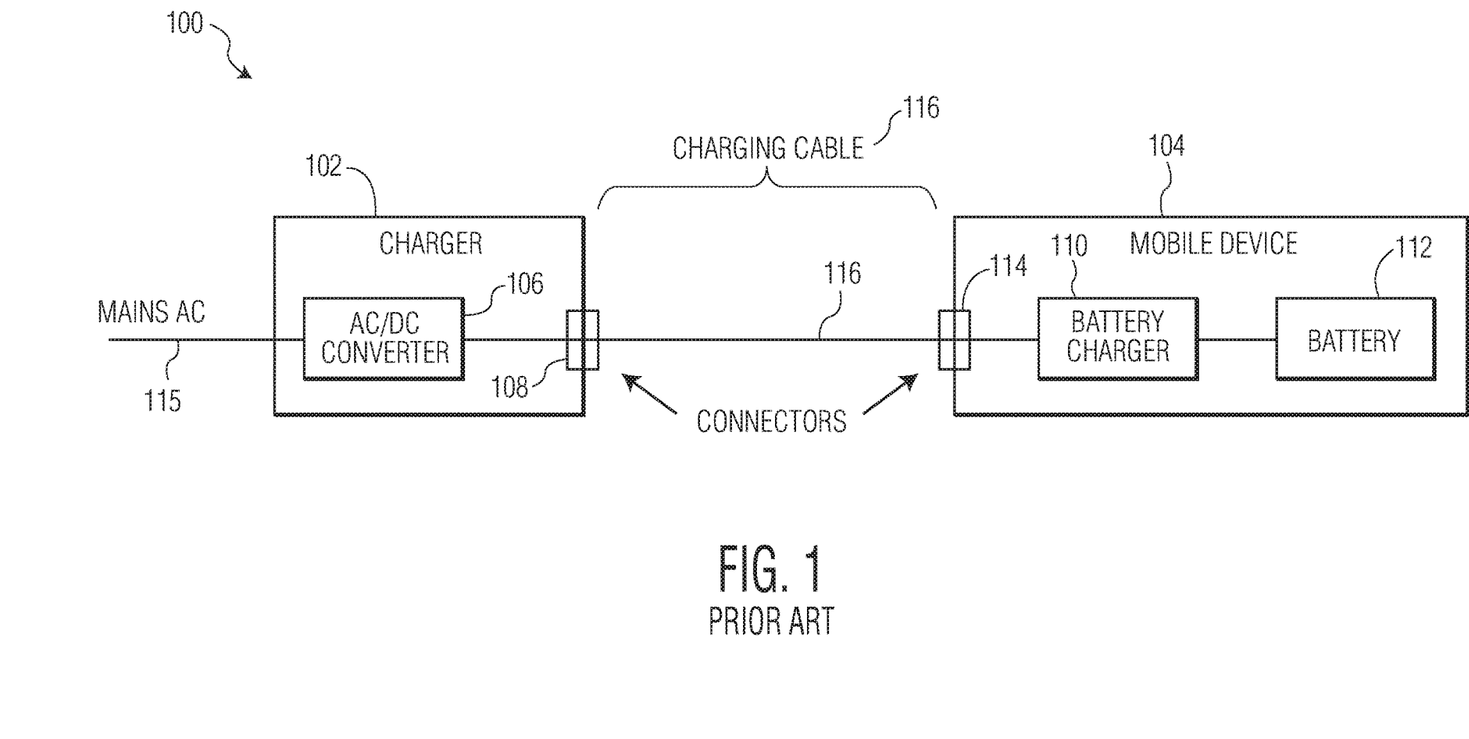
FIG. 1 is a first example of charging between a first device and a second device.

FIG. 1 (Prior Art) is a first example 100 of charging between a first device 102 and a second device 104. In this example the first device 102 is a charger and the second device 104 is a mobile device.

The first device 102 includes an AC/DC converter 106 and a first connector 108. The second device 104 includes a battery charger 110, a battery 112, and a second connector 114.

The first device 102 is connected to a mains AC 115 (e.g. an AC wall outlet power source) and a first end of a charging cable 116. The second device 104 is coupled to a second end of the charging cable 116. During charging, power at a fixed voltage and maximum current level is then transferred from the first device 102 to the second device 104.

Figure 2:
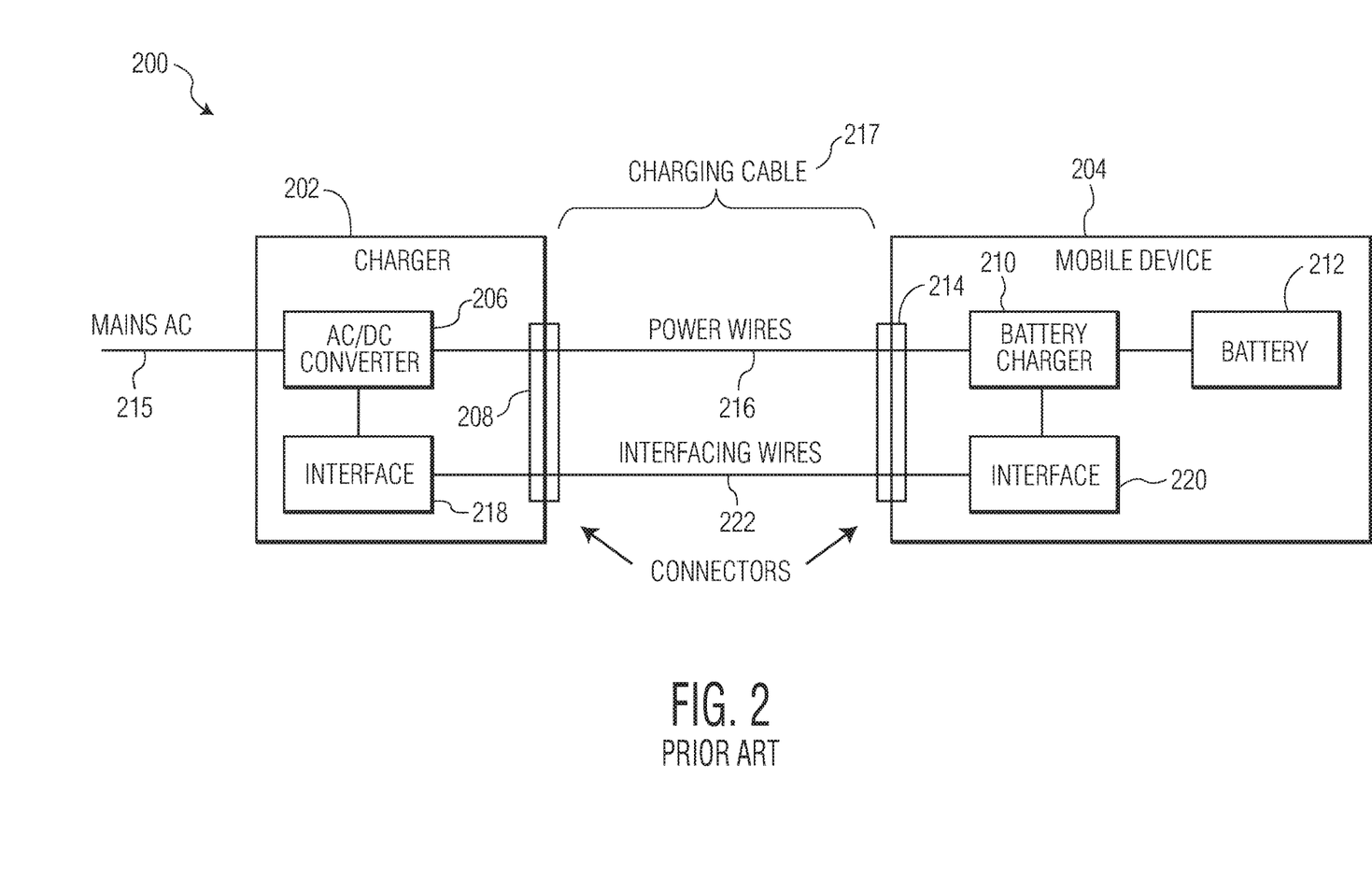
FIG. 2 is a second example of charging between a first device and a second device.

FIG. 2 (Prior Art) is a second example 200 of charging between a first device 202 and a second device 204. In this example the first device 202 is a charger and the second device 204 is a mobile device.

The first device 202 includes an AC/DC converter 206, a first connector 208, and a first interface circuit 218. The second device 204 includes a battery charger 210, a battery 212, a second connector 214, and a second interface circuit 220.

The first device 202 is connected to a mains AC 215 (e.g. an AC wall outlet power source) and a first end of a charging cable 217. The second device 204 is coupled to a second end of the charging cable 217. The charging cable 217 includes a set of power wires 216 and a set of interface wires 222.

In this example 200, the first device 202 is a smart charger and the additional communication interface circuits 218, 220 and wires 222 communicate the second device's 204 charging parameters (e.g. acceptable voltage and current levels) and the first device's 202 charging parameters (e.g. ability of the smart charger to provide voltage and current to the second device 204). Such interface communications enable boost charging and/or fast charging in some example embodiments.

Smart chargers thus can exchange device type information through the interface connection 218, 220, 222. Certain types of second devices 204 have certain voltage, current and power parameters, and the smart charger adjusts its output to fall within those parameters. Some smart chargers also ask the second device 204 for its battery's current charge state.

An ability to charge mobile devices, such as mobile phones, faster however is beneficial. Faster charging, in some example embodiments, requires higher charging currents. When applying such high charging currents, a sudden disconnect by a user (e.g. by pulling out a charging cable connector plug) may result in damage to the connector and/or the electronic circuits because of arcing. This is a spark occurring on the terminals of the connectors induced by a sudden discontinuity of the charging current.

Now discussed are example ultrasound-based circuits and algorithms for predicting when a device receiving power is about to be disconnected from a power source (e.g. a user's behavior is about to result in disconnection of the device) and reduce or stop power transfer in anticipation of such disconnect.

The ultrasound-based circuits and algorithms apply to devices of any size, from smartphones to electric cars. Also the power transfer can be wired (e.g. wire/cable) or wireless (e.g. inductive). Predicted disconnections can be intentional or accidental (e.g. an electric car driving away from a charge point with the power cable still connected to the car).

In various example embodiments incorporating multiple ultrasound-based circuits, a distinction can be made between which-end of a wired coupling is being disconnected (e.g. a less arcing sensitive Type-A connector at a laptop end, or a more arcing sensitive micro-USB connector at a smartphone end).

Example embodiments incorporating multiple ultrasound-based circuits, can also distinguish between users and device-types, having one power disconnect profile for a first user and/or device that is different from a power disconnect profile from a second user and/or device.

Figure 3:
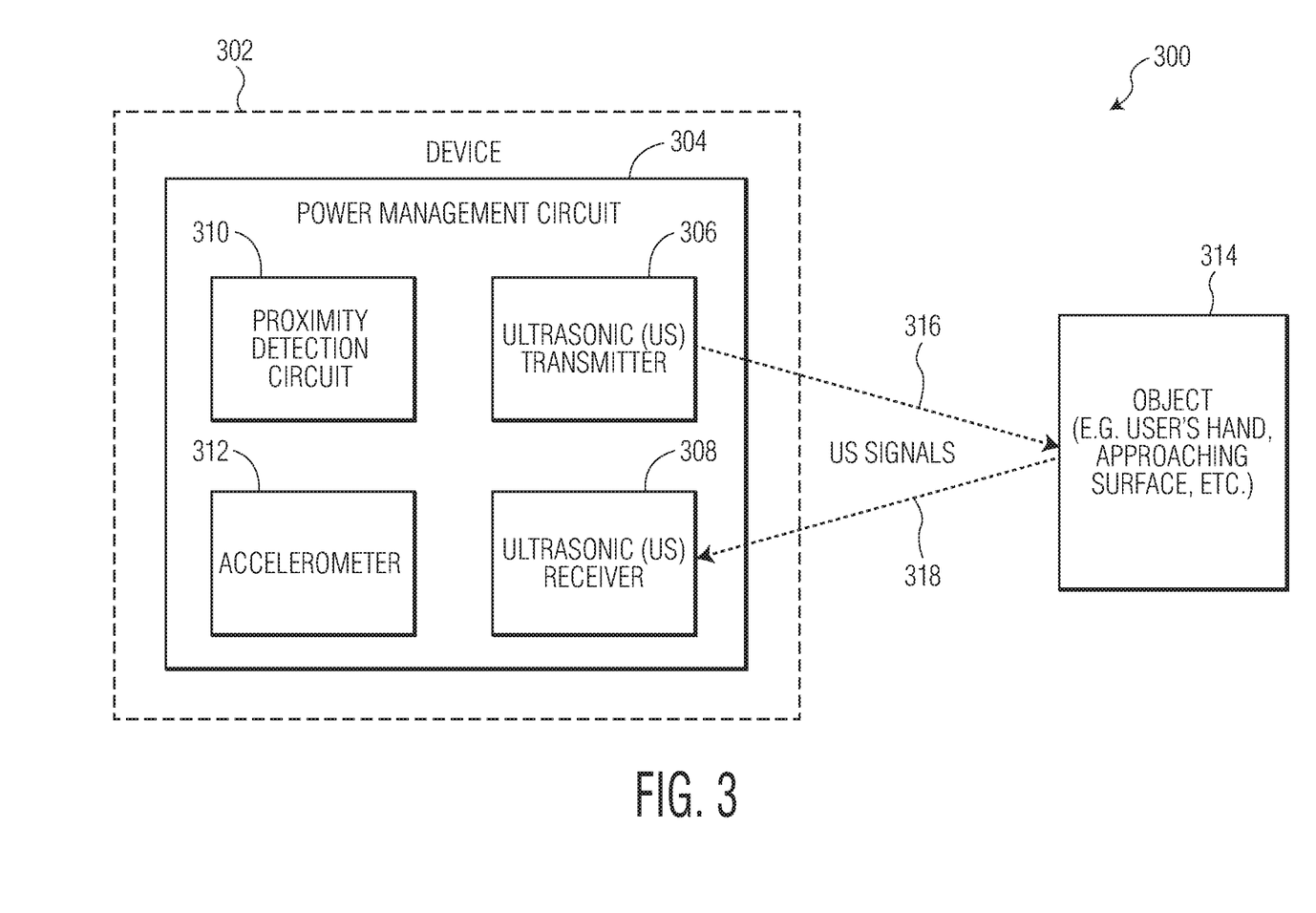
FIG. 3 is a first example of a power management circuit in a device.

FIG. 3 is a first example 300 of a power management circuit 304 in a device 302. The power management circuit 304 includes an ultrasonic transmitter 306, an ultrasonic receiver 308, and a proximity detection circuit 310. The power management circuit 304 presents an example embodiment of a circuit for permitting faster charging using higher currents without damaging the device 302.

The power management circuit 304 is configured to charge the device 302 at a first power level and a second power level. The ultrasonic transmitter 306 is configured to generate a transmitted ultrasonic signal 316 having a set of transmitted ultrasonic signal attributes. The ultrasonic receiver 308 is configured to detect a received ultrasonic signal 318 from a reflected version of the transmitted ultrasonic signal 316 which interacts with an object 314.

The ultrasonic signal attributes include at least: amplitude, phase, impedance, and ultrasonic signal power level. The object 314 is herein defined broadly to include at least: a user's hand, another device, a desk surface, a smartphone, a battery charger, a docking station, a car charger, a user's skin, or a user's clothes.

The ultrasonic transmitter 306 and ultrasonic receiver 308 in some example embodiments can be configured to interface with existing audio (e.g. speakers and microphones), DSP and MCU hardware on the device 302 (e.g. a smart phone). In such embodiments, the ultrasound frequency being used can be limited to about 20 kHz, since sample rates of a smartphone's audio DAC-ADC can be as low as 44 kHz, meaning that sound up to 22 kHz can be resolved. The ultrasound frequency however should be high enough in order to be inaudible to smartphone user's ear. This means the frequency should be higher than 18 kHz. Thus a frequency band between 18.5 kHz and 20 kHz would be compatible to an existing smartphone operating system like Android OS.

The received ultrasonic signal 318 has a set of received ultrasonic signal attributes. The proximity detection circuit 310 is configured to transition the device 302 from the first power level (e.g. for charging) to the second power level (e.g. for charging) in response to a preselected difference between the transmitted ultrasonic signal 316 attributes and the received ultrasonic signal 318 attributes.

In some example embodiments, the proximity detection circuit 310 includes a software algorithm or circuits configured to detect small motions up to a few meters from the device 302 using Doppler shift techniques.

In some example embodiments, a few meters ultrasonic range is sufficient to cover a distance between the device 302 and the object 314 (e.g. both ends of a charging cable). While ultrasonic motion sensing in some example embodiments may not be very directional, such that individual connectors could be monitored, a number false-positives (i.e. where the proximity detection circuit 310 concludes that device is about to be disconnected while it is not), and a number of false-negatives (i.e. situation where the proximity detection circuit 310 failed to detect that device is about to be disconnected) can be within an acceptable error range.

Example embodiments of the power management circuit 304 may or may not be configured to be connected to a physical charging cable. The power management circuit 304 may put the device 302 (e.g. a charger, a smartphone, electric car, etc.) in a lower or higher power state for a variety of reasons (e.g. for high power wireless charging).

In one example embodiment the preselected difference between the transmitted ultrasonic signal 316 attributes and the received ultrasonic signal 318 attributes is a range (e.g. phase difference between 90 degrees and 270 degrees). In another example embodiment the preselected difference between the transmitted ultrasonic signal 316 attributes and the received ultrasonic signal 318 attributes is a variation (i.e. non-steady state) from a baseline (i.e. steady-state) ultrasonic signal attribute. Note in various example embodiments, the proximity of an object can be detected even if only one of the attributes of the sets 316, 318 differ.

Figure 4:
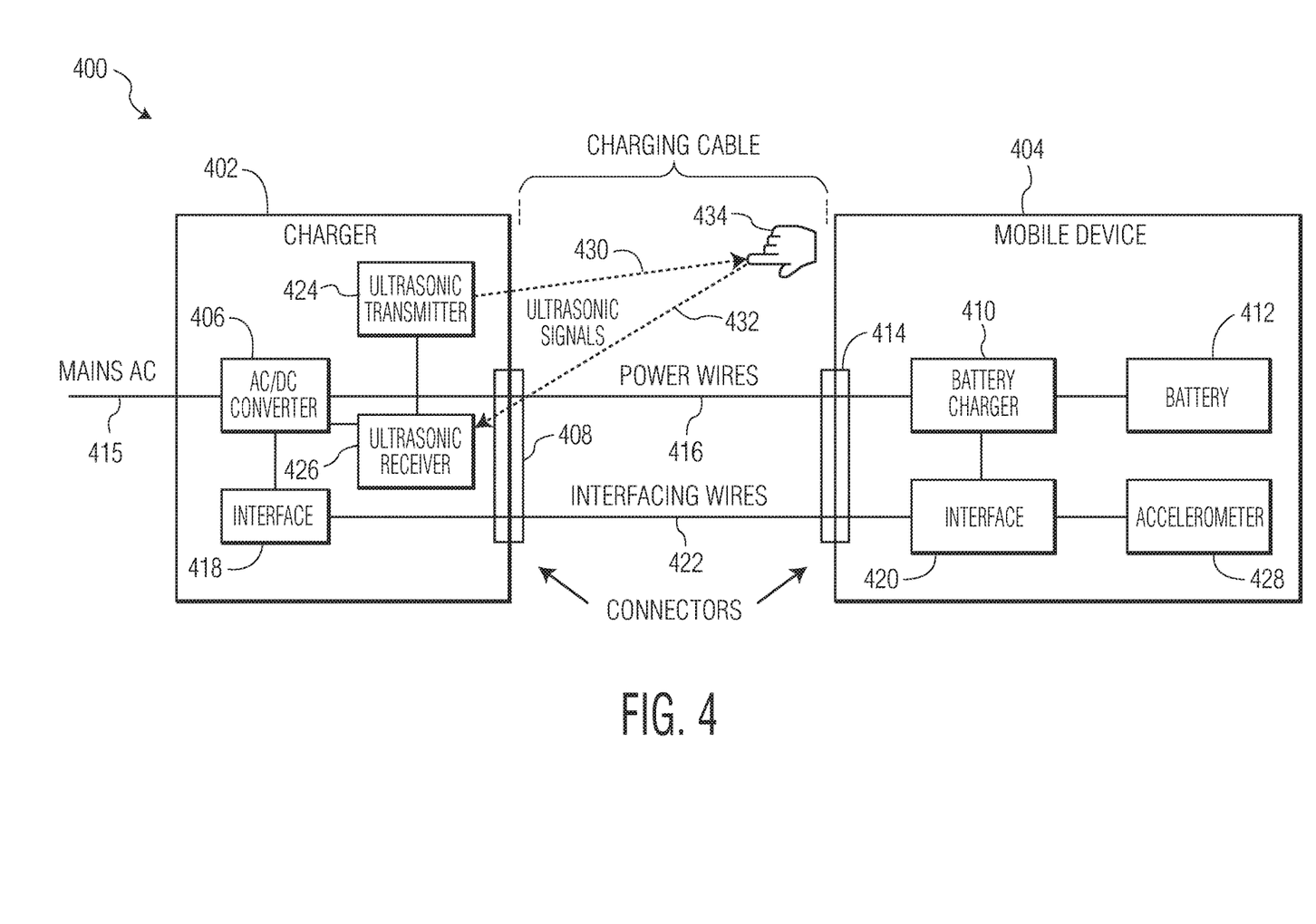
FIG. 4 is an example of a power management circuit distributed between a first device and a second device.
Figure 5:
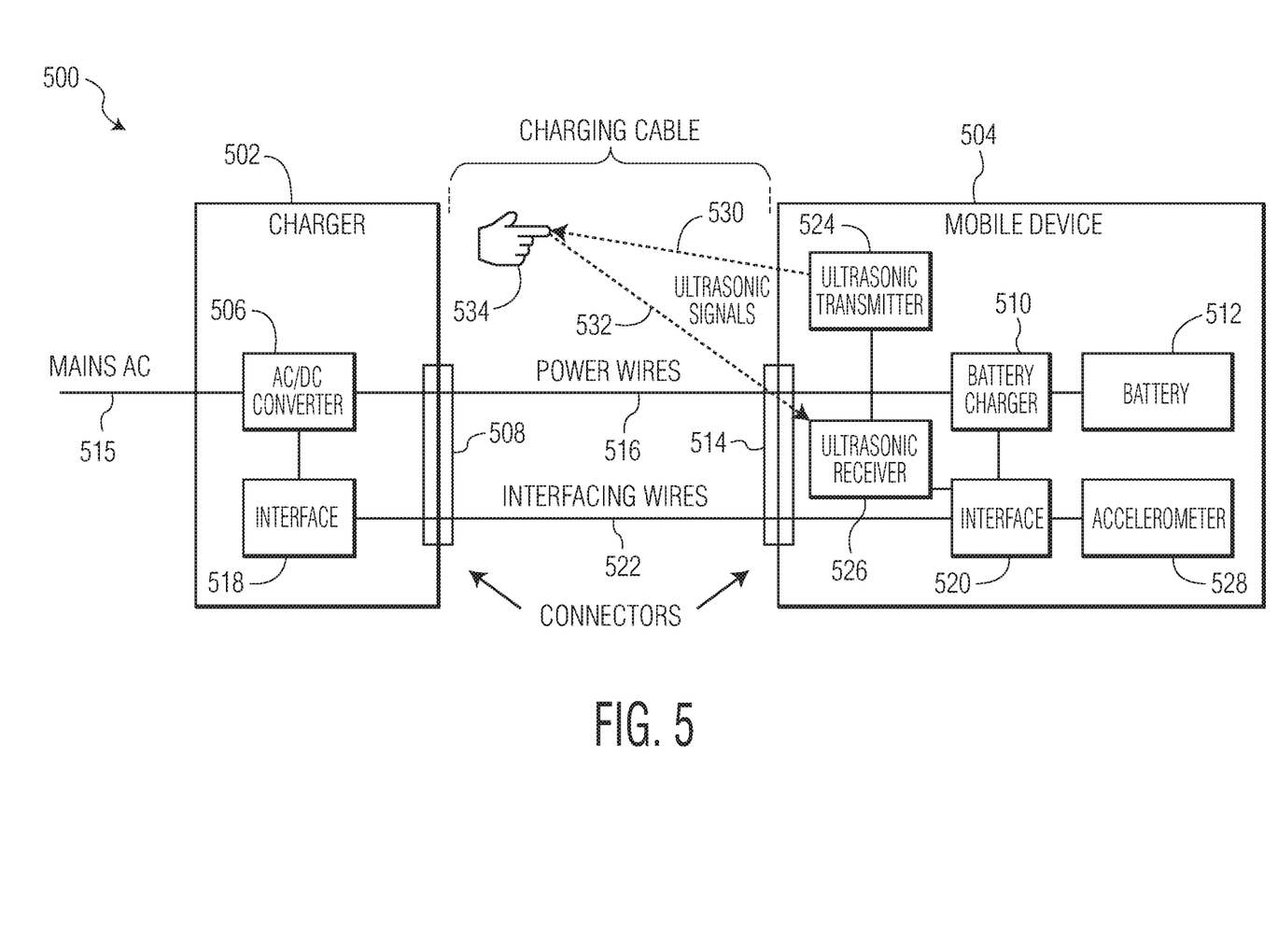
FIG. 5 is a second example of charging between a first device and a second device using a power management circuit.

Thus as an example, to avoid voltage spikes and arcing, the power management circuit 304 shifts the device 302 to a lower charging current level, or switches the device 302 completely off before disconnect by a user putting the device 302 in a state where an arc or voltage surge could occur (e.g. pulling out a charging cable, see FIGS. 4 and 5, connected to a device such as a mobile device, a smartphone, tablet, or a laptop).

The transmitted ultrasonic signal 316 in some example embodiments can be pulsed for low power operation. The transmitted ultrasonic signal's 316 repetition frequency depends on the required reaction time for the device 302 to be switched between high and low power modes. For example, a user about to pick up the device 302 or disconnect a charging cable may need a faster response than if the proximity detection circuit 310 is used to wake-up the device 302.

Additionally an accelerometer 312 (i.e. gyro detector) can be added to detect movement of the device 302 (e.g. intentional movement by a user or some other force such as falling off a table), thereby causing the power management circuit 304 to command a reduction in a charging or other current.

In some example embodiments, proximity detection and movement detection work in combination for certain high to low power mode shifts, and in other example shift the device 302 from high to low (or low to high) power mode individually.

FIG. 4 is an example 400 of a power management circuit distributed between a first device 402 and a second device 404. In this example the first device 402 is a charger and the second device 404 is a mobile device.

The first device 402 includes an AC/DC converter 406, a first connector 408, a first interface circuit 418, an ultrasonic transmitter 424, and an ultrasonic receiver 426. Functionality for the proximity detection circuit is distributed between the first interface circuit 418, the ultrasonic transmitter 424 and the ultrasonic receiver 426.

The second device 404 includes a battery charger 410, a battery 412, a second connector 414, a second interface circuit 420 and an accelerometer 428 (e.g. gyro detector).

The first device 402 is connected to a mains AC 415 (e.g. an AC wall outlet power source) and a first end of a charging cable. The second device 404 is coupled to a second end of the charging cable. The charging cable includes a set of power wires 416 and a set of interface wires 422. The power wires 416 between the charger 402 and mobile device 404 conduct current to charge the battery 412 of the mobile device 404.

The ultrasonic transmitter 424 generates and transmits an ultrasonic signal 430 and the ultrasonic receiver 426 receives ultrasonic signal 432 for proximity detection of an object 434 (e.g. a hand in this example). The transmitted ultrasonic signal 430 and received ultrasonic signal 432 shown enable the proximity detection circuit in the device 402 to detect any changes due to the proximity of the hand 434 to one or both of the connectors 408, 414.

The proximity detection circuit detects if the mobile device 404 is in a steady state, and thus can be charged by the charger 402 at a high power level. However, once the hand 434 comes within a predefined distance from the charging cable, the proximity detection circuit reduces the charging power level to a lower power level to prevent damage to the cable or connectors 408, 414 upon any disconnect.

In some examples, especially in combination with the accelerometer 428 in the mobile device 404, the mobile device 404 will send a message to the charger 402 via the interface wires 422 requesting that the charging current be reduced. In this example, the proximity detection circuit is distributed between both the charger 402 and the mobile device 404.

FIG. 5 is a second example 500 of charging between a first device 502 and a second device 504 using a power management circuit. In this example the first device 502 is a charger and the second device 504 is a mobile device.

The first device 502 includes an AC/DC converter 506, a first connector 508, and a first interface circuit 518.

The second device 504 includes a battery charger 510, a battery 512, a second connector 514, a second interface circuit 520, an ultrasonic transmitter 524, an ultrasonic receiver 526, and an accelerometer 528 (e.g. gyro detector). Functionality for the proximity detection circuit is distributed between the second interface circuit 520, the ultrasonic transmitter 524, the ultrasonic receiver 526, and the accelerometer 528.

The first device 502 is connected to a mains AC 515 (e.g. an AC wall outlet power source) and a first end of a charging cable. The second device 504 is coupled to a second end of the charging cable. The charging cable includes a set of power wires 516 and a set of interface wires 522. The power wires 516 between the charger 502 and mobile device 504 conduct current to charge the battery 512 of the mobile device 504.

The ultrasonic transmitter 524 generates and transmits an ultrasonic signal 530 and the ultrasonic receiver 526 receives ultrasonic signal 532 for proximity detection of an object 534 (e.g. a hand in this example). The transmitted ultrasonic signal 530 and received ultrasonic signal 532 shown enable the proximity detection circuit in the device 502 to detect any changes due to the proximity of the hand 534 to one or both of the connectors 508, 514.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A power management circuit, comprising:
an ultrasonic transmitter configured to generate an ultrasonic signal having a set of transmitted ultrasonic signal attributes;
an ultrasonic receiver configured to detect the ultrasonic signal having a set of received ultrasonic signal attributes;
wherein the power management circuit is configured to be embedded in a device and cause the device to be operated at a first power level and a second power level; and
a proximity detection circuit configured to transition the device from the first power level to the second power level in response to a preselected difference between the transmitted set of ultrasonic signal attributes and the received set of ultrasonic signal attributes;
a connector coupled to the device and configured to be coupled to a cable;
wherein the connector and cable are configured to carry the first power level and the second power level from a power source;
wherein the proximity detection circuit is configured to transition the device from the first power level to the second power level in response to an object near the cable.

2. The circuit of claim 1:
wherein the first power level is higher than the second power level.

3. The circuit of claim 1:
wherein the first and second power levels are non-zero.

4. The circuit of claim 1, wherein:
the first power level includes a first current level for charging the device; and
the second power level includes a second current level, less than the first current level, for charging the device.

5. The circuit of claim 1, wherein:
the first power level includes a first voltage level for charging the device; and
the second power level includes a second voltage level, less than the first current level, for charging the device.

6. The circuit of claim 1:
wherein the transmitted and received attributes include at least one of: an amplitude, a phase, an impedance, a delay, and an ultrasonic signal power level.

7. The circuit of claim 1:
wherein the transmitted and received attributes are configured to vary based on at least one of: a proximity or movement of a user's hand, skin or clothing to the device, and a proximity or movement of a user's hand to the cable connected to the device.

8. The circuit of claim 1:
wherein the proximity detection circuit is configured to transition the device from the first power level to the second power level in response to a preselected variation in the difference between the transmitted set of attributes and the received set of attributes over a preselected time period.

9. The circuit of claim 8:
wherein the proximity detection circuit is configured to not transition the device from the first power level to the second power level if the preselected variation in the difference between the transmitted set of attributes and the received set of attributes does not vary over the preselected time period.

10. The circuit of claim 1:
further comprising an accelerometer configured to detect movement of the device.

11. The circuit of claim 10:
wherein the proximity detection circuit is configured to transition the device from the first power level to the second power level in response to either or both the preselected difference between the transmitted set of attributes and the received set of attributes, or movement of the device.

12. The circuit of claim 1:
wherein the power management circuit is embedded in at least one of: a battery charger, a mobile charger, a battery powered device, an electric car, or an electric car charger.

13. The circuit of claim 1:
further comprising a power source;
wherein the power source is at least one of: a main AC source, or another battery; and
wherein the proximity detection circuit is configured to transition the power source from the first power level to the second power level in response to the preselected difference between the transmitted set of attributes and the received set of attributes.

14. The circuit of claim 1:
wherein the ultrasonic transmitter is configured to pulse the ultrasonic signal;
wherein a frequency of the ultrasonic signal is set based on a predefined rate at which the preselected difference between the transmitted set of attributes and the received set of attributes changes; and
wherein a frequency of the ultrasonic signal is set based on a predefined rate at which a user can disrupt charging of the device.

15. The circuit of claim 1:
wherein the device is a smartphone; and
wherein the object is a user's hand.

16. The circuit of claim 1:
wherein the device is an electric car charger; and
wherein the object is an electric car or a user's hand.

17. The circuit of claim 1:
wherein the cable has a first end connector configured to withstand a first arcing current;
wherein the cable has a second end connector configured to withstand a second arcing current;
wherein the proximity detection circuit is configured to transition the device from the first power level to the second power level in response to the object near the first end connector;
wherein the proximity detection circuit is configured to transition the device from the first power level to a third power level in response to the object near the second end connector; and
wherein the second power is greater than the third power level.

18. The circuit of claim 1:
wherein the ultrasonic transmitter is a speaker; and
wherein the ultrasonic receiver is a microphone.

19. The circuit of claim 1:
wherein the device is configured to be coupled to a wireless charger;
wherein the ultrasonic transmitter and ultrasonic receiver are configured to be coupled to the wireless charger; and
wherein the wireless charger is within a detection range of the ultrasonic signal.

* * * * *